Figure 1:
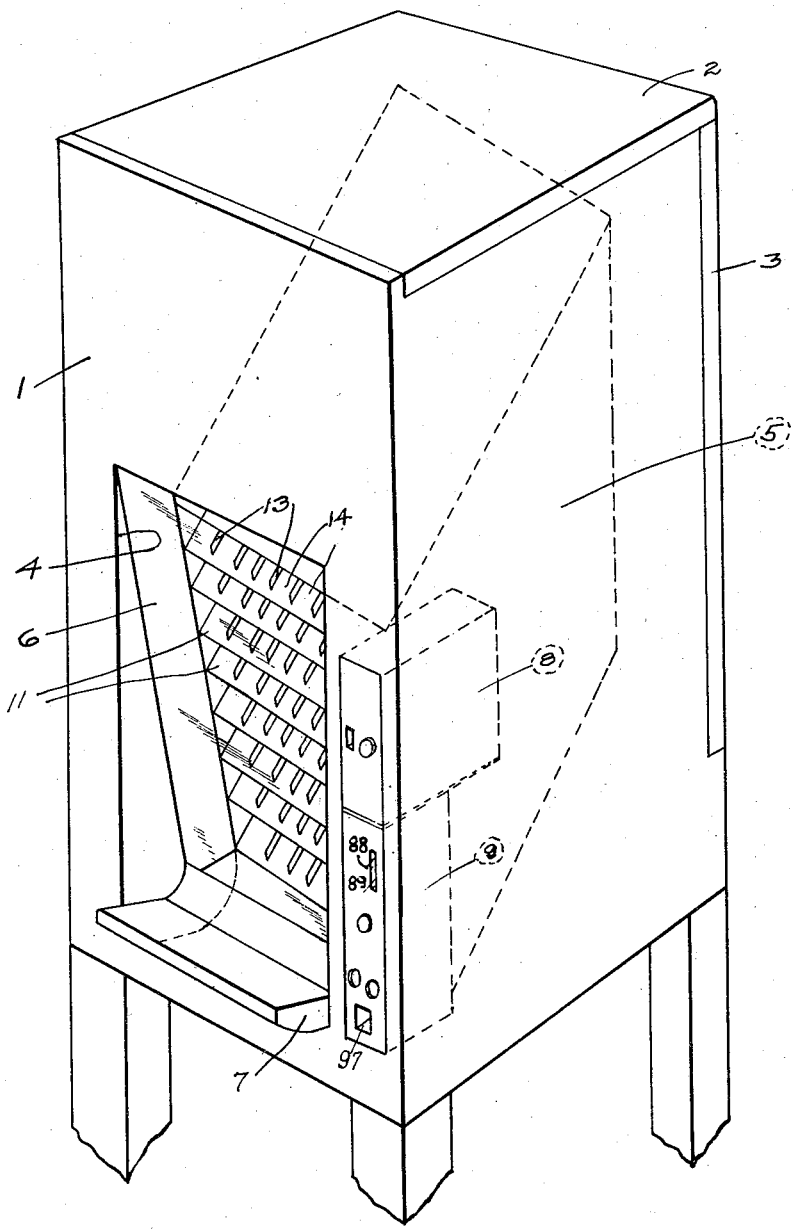

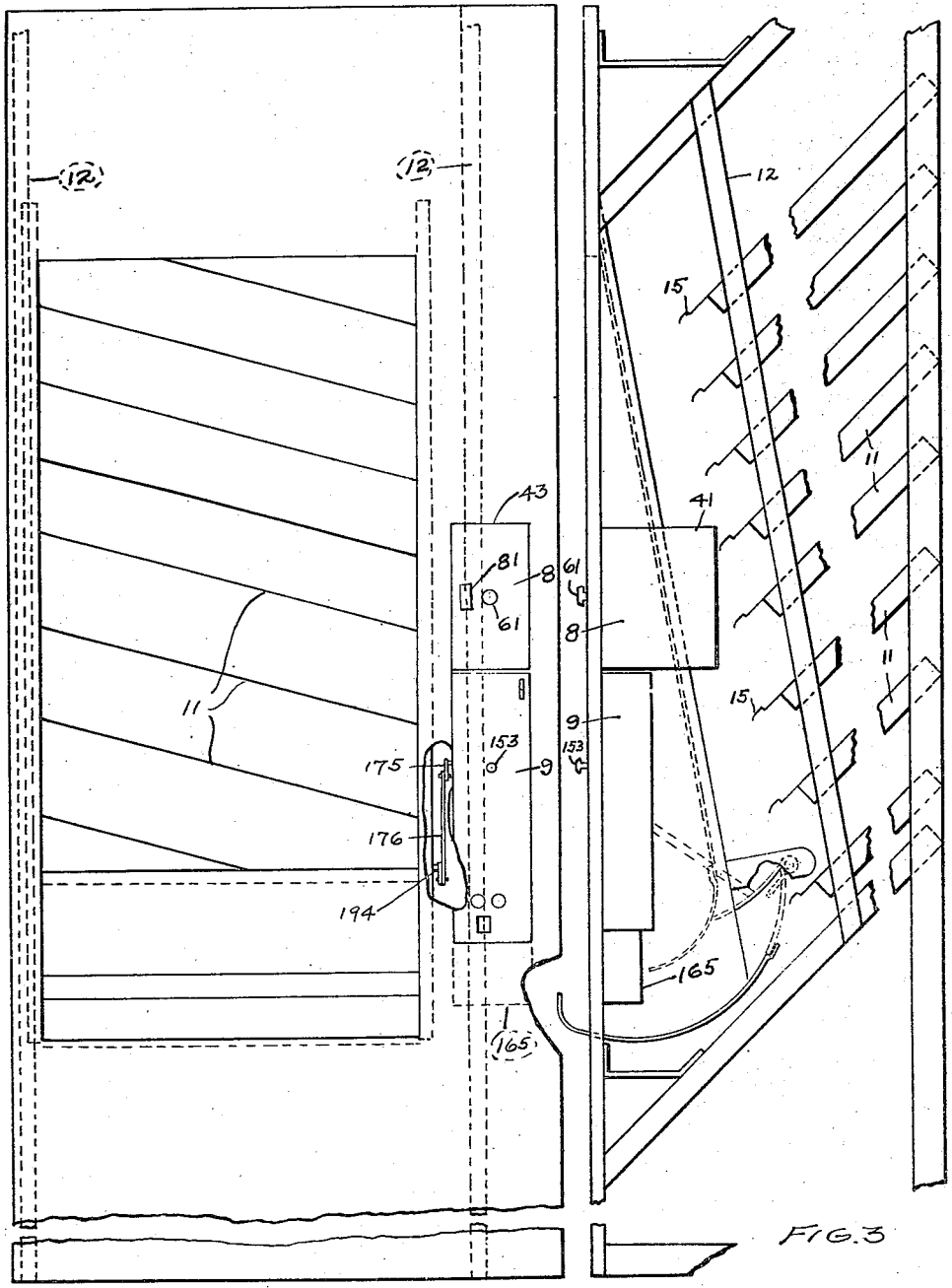

July 23, 1935.    E. G. WEILER    2,008,735
VENDING APPARATUS
Filed Dec. 31, 1928    6 Sheets-Sheet 3
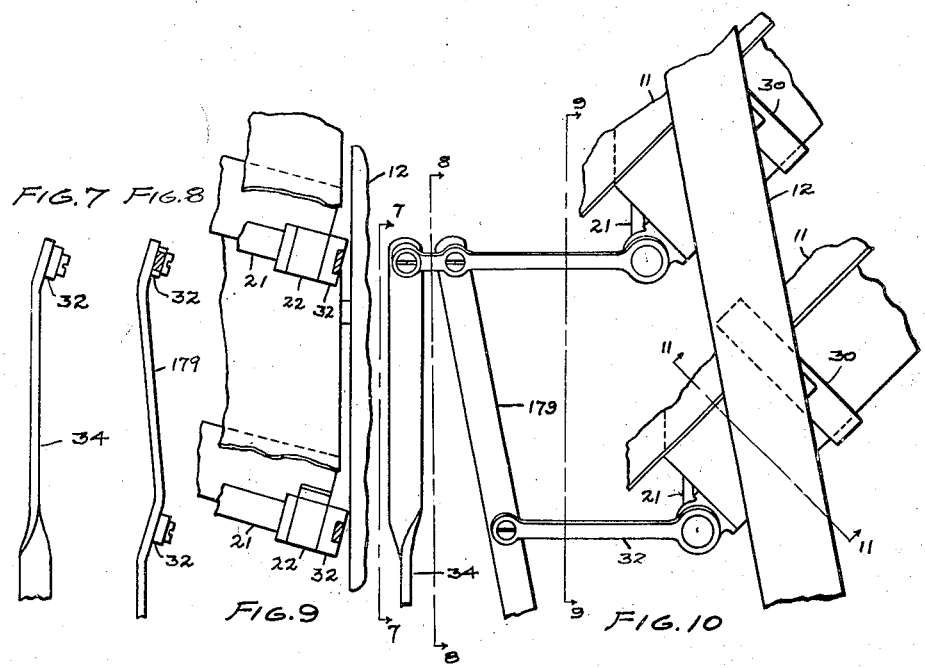
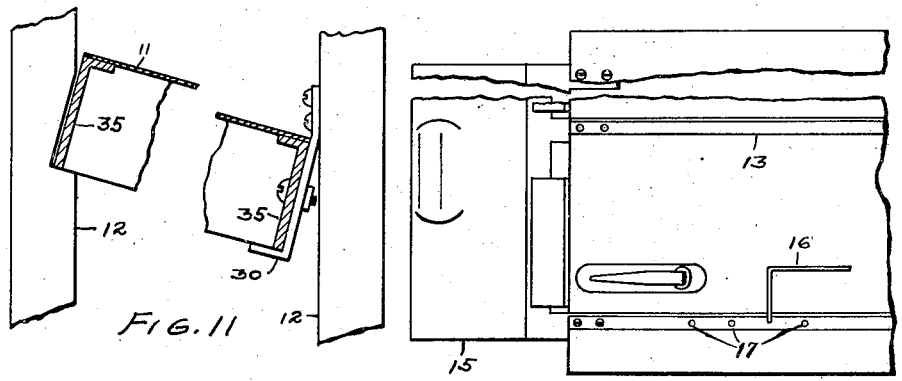
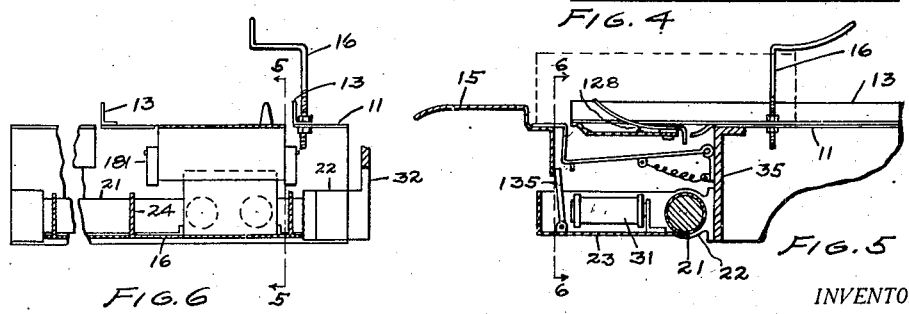
INVENTOR.
Edward G. Weiler
BY
Jay, Oberlin + Fay
ATTORNEYS

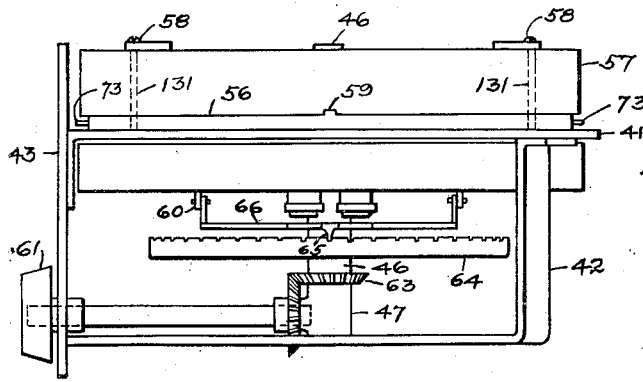
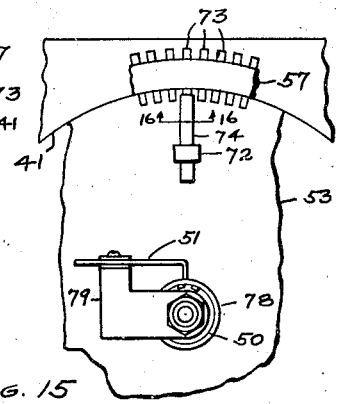
FIG.13  FIG.15
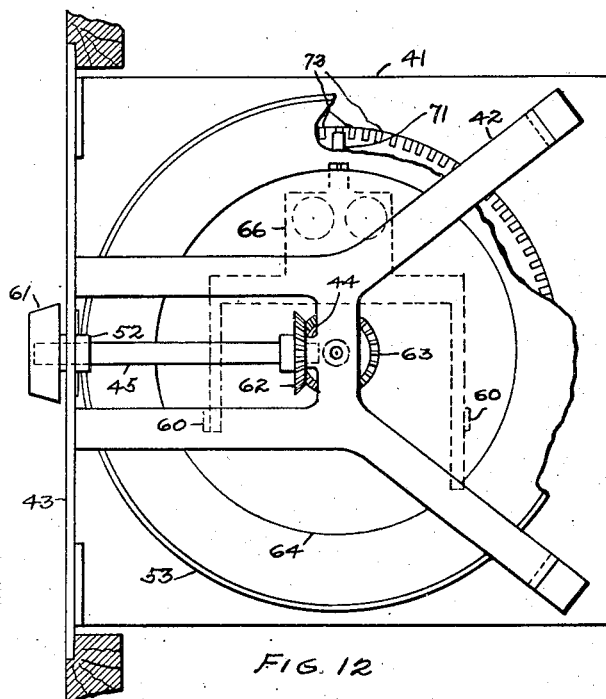
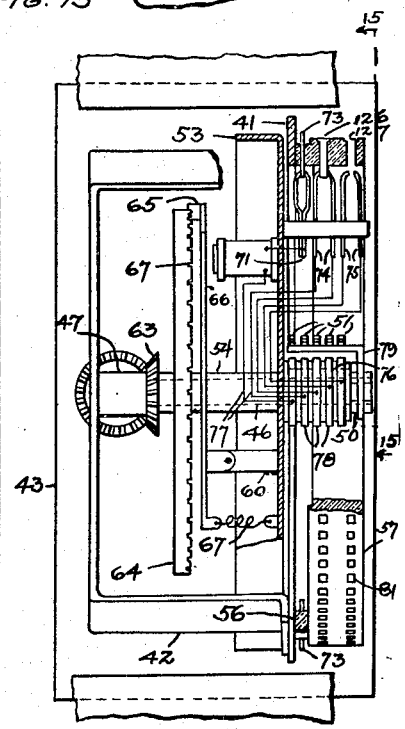
FIG.12  FIG.14
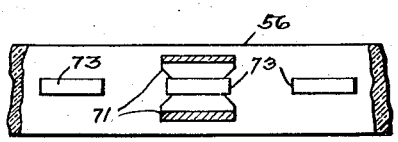
FIG.16
INVENTOR.
Edward G. Weiler
BY
Jay, Oberlin + Jay
ATTORNEYS

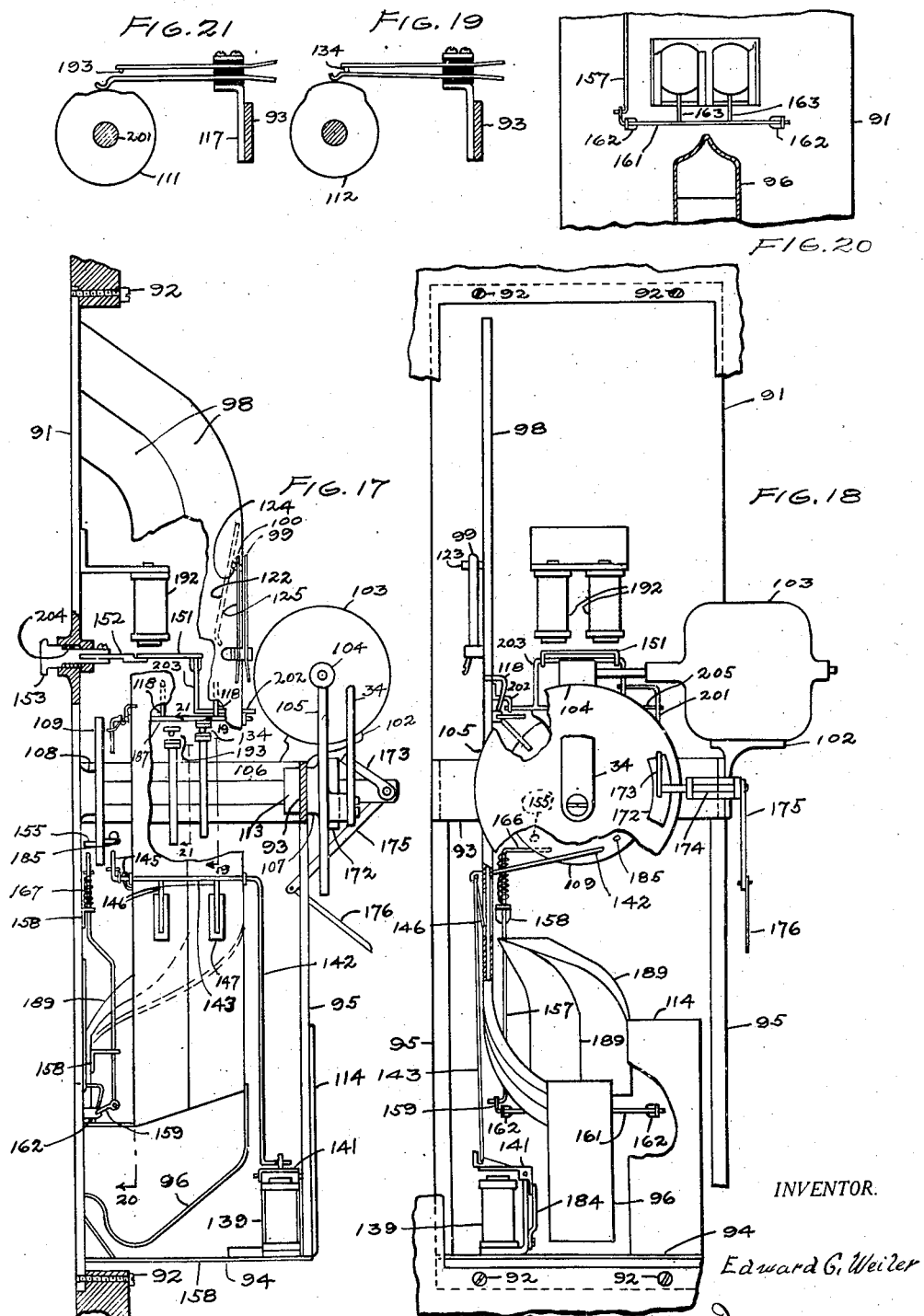

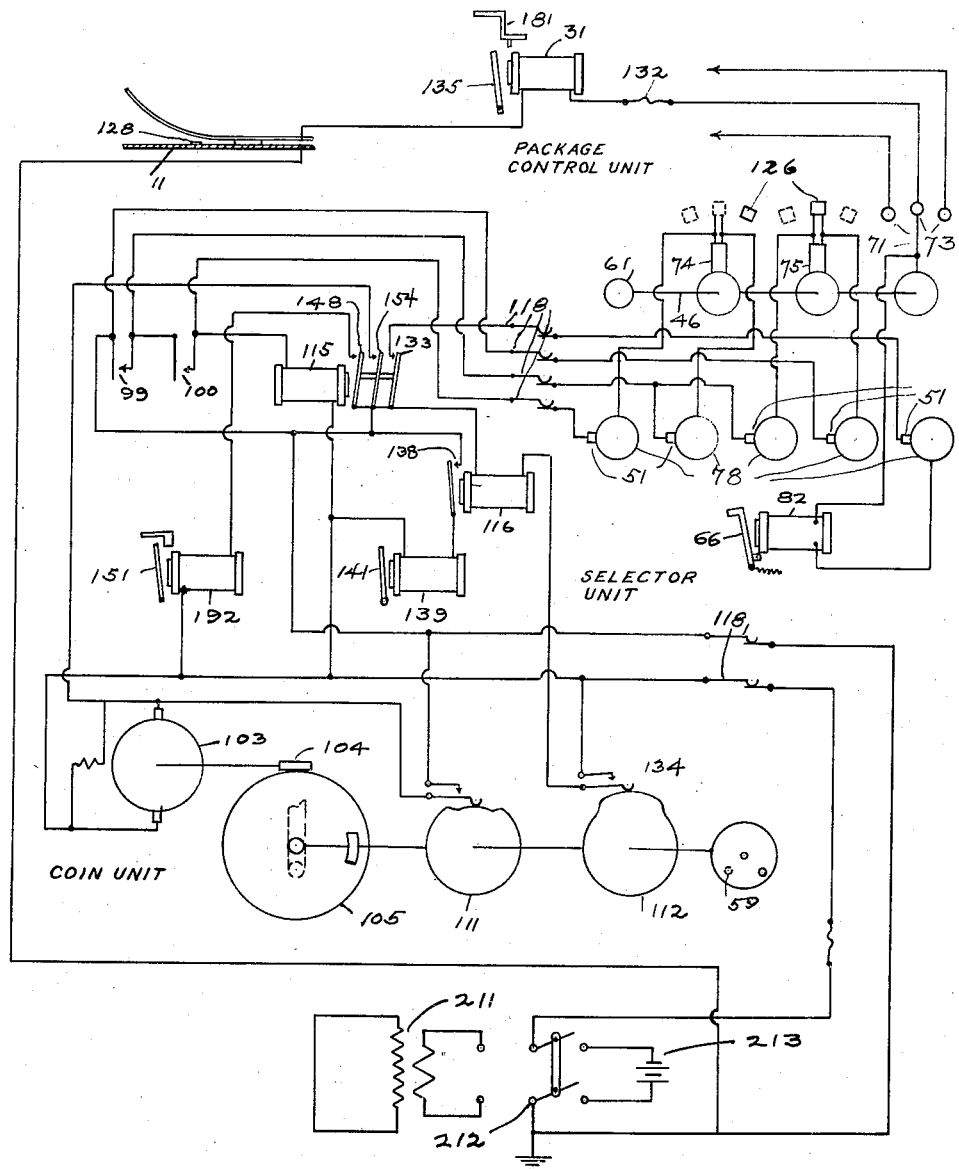

Patented July 23, 1935

2,008,735

UNITED STATES PATENT OFFICE 2,008,735

VENDING APPARATUS

Edward G. Weiler, Columbus, Ohio

Application December 31, 1928, Serial No. 329,514

28 Claims. (Cl. 194—10)

This invention as indicated relates to a vending apparatus. More particularly it comprises an apparatus which is coin-controlled and which provides for pre-selection of any of a plurality of articles and provides for the automatic delivery of the article. It includes means for dispensing a wide variety of articles at a variety of prices for the different articles. It also includes means for refunding the deposited coins in case of mistake or when the supply of the article selected is exhausted. It further includes separable operative and supply units each having novel features of construction and applicable to other uses than those herein described, but cooperating in the apparatus shown to effect a result not heretofore attained.

It is the principal object of the invention to provide a vending apparatus in which a large variety of articles of various shapes and sizes may be vended by one apparatus and to provide a common selective apparatus by means of which any one of a number of different articles contained in the device may be selected and discharged therefrom on the depositing of proper coins or tokens. This selective apparatus not only selects the article which will be dispensed by the operation of the apparatus but at the same time prepares the machine to respond only to the particular coin or coins required for the particular article selected. Thus the same apparatus will dispense articles of different prices, but will respond only when coins covering the price of the particular article selected are inserted.

Another object of the invention is to provide an improved storage construction whereby articles of various shapes and sizes may be stored at some distance from the coin-controlled apparatus with a remote control selective arrangement to release any article selected and means to discharge the same from the apparatus.

A further object of the invention is to construct the various parts of the apparatus as separable units so that in case any unit gets out of order it may be removed for repair and a substitute unit put in its place temporarily. In the construction illustrated, the group of storage shelves is one unit, having removable subdivisions, the selecting apparatus another unit, and the coin-controlled apparatus another unit, all of the units being suitably mounted in a cabinet or housing and interconnected so as to function in proper relation to each other. In very large constructions the supply shelves may take up the greater part of the space in the room in which the apparatus is housed. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a perspective view of the apparatus housed in a cabinet; Fig. 2 is a front elevation of the device shown in Fig. 1; Fig. 3 is a side elevation of the device shown in Fig. 2 with the side panel of the cabinet removed; Fig. 4 is a top plan view of the front portion of a shelf detached from the apparatus; Fig. 5 is a side view and sectional elevation of the structure shown in Fig. 6, taken along the line 5—5, looking in the direction of the arrows; Fig. 6 is a sectional elevation of a portion of a shelf and an article release mechanism, taken along the line 6—6 shown in Fig. 5, looking in the direction of the arrows; Fig. 7 is a detail view of the upper end of the package release rod as seen along the line 7—7 shown in Fig. 10; Fig. 8 is a detail view of the upper end of the link interconnecting all the package release levers taken along the line 8—8 in Fig. 10, looking in the direction of the arrows; Fig. 9 is a front detail view of the shelf mechanism shown in Fig. 10, taken along the line 9—9 in Fig. 10, looking in the direction of the arrows; Fig. 10 is a side detail view showing portions of two shelves and portions of the article control mechanism; Fig. 11 is a detail view of the shelf mechanism taken along the line 11—11, shown in Fig. 10; Fig. 12 is a side elevation of the selector unit partially in section; Fig. 13 is a top plan view of the structure shown in Fig. 12; Fig. 14 is a rear elevation of the structure shown in Fig. 12; Fig. 15 is a detail view of the selector unit as seen along the line 15—15 in Fig. 14, looking in the direction of the arrows; Fig. 16 is an enlarged detail view partly in section of the brush and terminal contact, taken along the line 16—16 shown in Fig. 15, looking in the direction of the arrows; Fig. 17 is a side elevation of the coin unit; Fig. 18 is a rear elevation of the coin unit; Fig. 19 is a detail view of the relay release cam and associated parts, taken along the line 19—19 shown in Fig. 17; Fig. 20 is a rear view of the coin display windows and the upper portion of the coin refund receptacle, taken along the line 20—20 shown in Fig. 17, looking in the direction of the arrows;

Fig. 21 is a detail view of the motor line maintaining switch mechanism, taken along the line 21—21 shown in Fig. 17, looking in the direction of the arrows; and Fig. 22 is a wiring diagram of the apparatus.

As is clearly shown in Fig. 1 of the drawings, the device may be housed within a cabinet 1 having doors or removable panels 2, 3, at its top and rear respectively, and having a large opening 4, centrally of the lower front panel, behind which is angularly disposed a set of shelves or article chutes 5, adapted to deliver articles against a sheet of glass 6, downwardly and inwardly inclined in back of the opening through the front panel. A delivery receptacle 7 is provided at the base of the opening, and a selector unit 8 and coin control unit 9 are provided at the right hand side of the central opening through the front panel.

The details of the construction will appear from the various views of the drawings. The set of shelves 5 shown in Fig. 1 are individually constructed as illustrated in Figs. 5 and 6. The plate 11 forming the storage shelf is supported on a frame work 12 of angle iron suitably braced. The storage shelves are mounted one above the other with a slight slope toward the right and a greater slope toward the front. Each shelf is divided by the partition walls or guides 13 into a number of storage compartments or delivery chutes 14. These chutes may be filled at the rear of the apparatus, and the forward slope is such that the packages will slide by gravity toward the front of the apparatus until the forward packages are engaged by the respective package stops 15. The slight slope of the shelves toward the right causes the packages to follow the adjacent guides. The apparatus shown is intended particularly for rectangular shaped package with smooth surfaces, preferably having one dimension greater than the others, but spherical or cylindrical articles can be also dispensed in the apparatus with suitable modification of the releasing or article delivery elements in shape and size.

The packages are placed lengthwise in the chutes but when the length of the package is almost the same as the other dimensions then an auxiliary guide member 16 is provided and adjusted to the size of the packages in the particular compartment to prevent them from turning out of position when they strike the stop 15. A number of apertures 17 are provided for the guide member 16 to allow adjustment to be made for packages of different lengths. For packages having one dimension substantially greater than the others this auxiliary guide member is not necessary. A shaft 21 extends the full width of the storage shelf and is supported at the ends and at intermediate points if required by bearings 22 attached to the framework 12. A package release plate 23 also extends the full width of the shelf and is rigidly attached to the shaft 21 and is made rigid by webs 24. A magnet 31 and associated armature is mounted on the release plate 23 under each storage compartment as shown in Figs. 5 and 6. A release lever 32, 33 is attached to each shaft 21 and these are interconnected by a link 179 as shown in Figs. 8 and 10 so that a movement transmitted by the package release rod 34 causes a parallel rotary movement of all the release plates 23 in the apparatus. A portion of two storage shelves and also the levers associated with the releasing or delivery actuating mechanism is shown in Fig. 10, and the method of mounting the angle iron braces 35 of storage shelves by means of angle straps 30 on the supports 12 and the approximate angles at which the shelves are mounted is shown in Fig. 11. A front view of the link 34 is shown in Fig. 5 and sectional views of the releasing mechanism appear in Figs. 8 and 10 respectively.

The selector unit is illustrated in side, top and rear views in Figs. 12, 13 and 14 respectively. A supporting plate 41 and bracket 42 are attached rigidly to each other and to the face plate 43, which is engaged into a suitable opening in the front panel of the cabinet. A bearing 44 for the selector knob shaft 45 and also for the hollow selector shaft 46 is provided by a boss 47 supported on the bracket. The wiring for the contact brushes 51 passes through the hollow selector shaft. A collar 52 attached to the selector knob shaft 45 prevents end play.

A selector drum 53 is supported on a sleeve 54, which also carries an insulator sleeve 50 with contact rings 78 and permits the same to rotate on the shaft. The base plate 41 has a circular opening 131 and serves as a support for the terminal assembly ring 56 and for the coin selector control ring 57. The ring 56 is rigidly attached to the support 41 and the ring 57 is held in place by means of screws 58. The rings 56 and 57 are kept in proper alinement by a lug 59. Through rotation of the selector knob 61 movement is transmitted by means of the shaft 45 and bevel gears 62 and 63 to the disc 64, the latter being rigidly attached to the gear 63. A tongue 65 carried by an armature 66 having extension arms provided with pivots 60 and held by tension of a spring 67 normally in engagement with one of the slots 68 in the disc 64 transmits the rotary movement of the disc 64 to the drum 53. Brushes 71 which are attached to the drum by means of insulators 72 are thus caused to move into contact with the various terminals 73 for the purpose of completing a circuit to the shelf containing the article desired.

A brush 71 in contact with a terminal 73 is shown in Fig. 16 which also shows that the width of the contact portion of the brush is slightly less than the gap between adjacent terminals to prevent engagement of the brush with more than one terminal at a time. Additional brushes 74, 75 are provided in alinement with the brushes 71 and are for the purpose of completing the circuits permitting the coin unit to respond to the particular coin or coins required for the particular article selected for delivery as will be explained later.

A part of the selector unit is shown in Fig. 15, wherein channels 76 are provided in the insulator sleeve 50 to contain the conductors 77 from the brushes 71, 74 and 75 to the contact rings 78. A supporting bracket 79 for the brushes 51 is attached to the hollow shaft 46.

The surface of the drum 53 contains numbers or other suitable designations corresponding with similar designations which are visible on the shelves on which the articles to be dispensed are located. These numbers when observed by the operator through the window 81 (see Fig. 2) are in alinement with the respective brushes 71, 74, 75, so that the proper circuits may be completed through the same for electrically operated releasing equipment on the shelf having a corresponding designation. The brush 71 is in the circuit of the magnet 82 for actuating the armature 66 as will be presently described.

The coin unit shown in Figs. 17 and 18, is out of the path of movement of a lug on the shifting arm 152 to which the refund button 153 is attached, thus rendering said mechanism ineffective. A contact 154 of relay 115 is adapted to close a circuit to operate the motor 103, which, as explained heretofore, through the worm 104 and the gear 105 is adapted to rotate the shaft 106, which will cause the pin 155 on the disc 109 to engage an arm 166 on a coin-display release bar 157 supported parallel to the coin channels 98, with a sliding engagement, moving the bar 157 downward in the bearings 158. The lower end of the coin display release bar 157 is attached to an arm 159 and is adapted to rotate the latter which in turn serves to rotate a shaft 161 in bearings 162 causing a pin 163 to be withdrawn from the coil channel releasing any coins which may have been held in the display window since the previous operation of the machine. The coins so released pass through the openings 164 in the base of the coin unit into a coin box 165. When the pin 155 on the disc 109 is moved out of contact with the arm 166 the release bar 157, and its associated mechanism, is returned to normal position by a spring 167.

As the shaft 106 is rotated, the cam 111 carried thereby will close a contact 193 which will hold the motor circuit closed until a full cycle of operations has taken place.

A closure 171 for the article delivery chute is adapted to be normally held closed by a boss 172 on the worm gear 105 by the interaction of an arm 173, a shaft 174, an arm 175, the link 176, and the arm 177 is closed by gravity as the boss 172 passes out of contact with the arm 173. When the worm gear 105 is moved through a half revolution, the package release rod 34 will raise the package release lever 32 and by means of the link 179 raise the other package release levers a like amount. The shaft 21 attached thereto will be given a rotary movement in bearings 22 which movement will be imparted to the package release plate 23 also attached to the shaft 21.

The armature 135 of magnet 31 is moved against the stop 137 on the package releasing pan 181 when the magnet is energized, and is adapted to engage the release pan 181, associated with the shelf compartment on which the article selected is located, and cause it to move upward engaging the lower end of the lower package which is normally prevented from sliding down the sloping shelf by the package stop 15. When the lower end of the lower package on the shelf is raised so that it clears the package stop 15, it will slide by gravity thereover and over the inclined surface of the glass 6 and into the delivery receptacle 7. The momentum of the package will be absorbed by the curvature of the delivery receptacle and the package will come to rest within reach of the customer. The other packages on the shelf will slide by gravity down the shelf until stopped by the release pan 181. During the second half of the revolution of the gear wheel 105, the release plate 23 will return to normal position, and the spring 183 will restore the package release pan 181 to normal position and the packages again slide a little distance down the shelf until stopped by the shoulder 15. It will be noted that one upand-down movement of the package release pan which occurs during one revolution of the gear wheel 105 will release one package.

When the shaft 106 has made a quarter turn, the cam 112 carried thereon will open the contact 134 which opens the circuit through the magnet 31 on the shelf and the contactor release magnet 82 and also the relay 116. The armature 135 of magnet 31 will be prevented from releasing immediately by frictional contact with the package delivery mechanism or release pan 181 but will be restored to normal by gravity when the release plate 23 returns to normal. The relay 116 will open the circuit of the coin trigger release magnet 139, the armature thereof will be restored to normal by a spring 184 adjacent thereto in preparation for locking the lever 142 as will be explained later. The armature 66 of the contactor release magnet 82 is restored to normal engagement with the selector operating disc 64 by means of the spring 67.

A pin 185 on the disc 109 is adapted to engage an operating arm 186 on a coin-releasing shaft 187 causing a coin-releasing arm 118 attached thereto to be removed from the path of the coin, releasing the coin which passes down the coin channel and is deflected by the "collect" arm 146 into a coin-collect chute 189. The coin is held in display until released by the next operation of the machine as heretofore explained. The lever 122 in the coin channel is adapted to be released by the removal of the coin and is restored to normal by the tension of the spring 125 opening the contacts 99 or 100. The circuit of relay 115 will thus be opened in turn opening the circuit of a refund release magnet 192 and allow the armature 151 to return to normal engagement with the refund button.

As has been stated, the opening of the contact 154 on the coin-control relay 115 does not open the motor circuit since this is kept closed by a shaft contact 193 so that the motor runs until the worm gear 105 has made a complete revolution.

As indicated above the boss 172 on the gear wheel 105 engages the arm 173 rotating the auxiliary operating shaft 174 and arm 175 attached thereto closing the safety closure 171 by means of the link 176 and the lever arm 177.

The pin 185 on the disc 109 engages the arm 149 on the shaft 143, rotating it against the tension of spring 145 until engaged by a notch on the armature 141 of the coin-trigger release magnet 139. The locking arm 142 for the coincollect shaft 143 remains locked in this position in preparation for the next operation of the machine. The coin-collect arm 146 is withdrawn from the coin channel so that if the customer releases the coin by operating the refund button as explained heretofore, the coin will pass down the coin channel into the refund box where it can be obtained by the customer. When the cam 111 is rotated, the shaft contact 193 is opened which opens the motor circuit stopping the motor, and a full cycle of operations will have been completed.

The refund button 153 provides means to enable the operator to discharge from the machine any coins deposited if the machine does not function to dispense a package. The following conditions may arise which would prevent the machine from operating to deliver a package: (1) A coin is now deposited in each of the coin channels 98 so that one or more of the contacts 99 or 100 is open; (2) The dial 42 is set midway between two numbers so that the contactor brush 71 which is not quite wide enough to bridge the gap between adjacent contacts 73 does not touch one of these contacts; (3) The contactor brush is set for connection with a shelf on which there is no package, therefore the contact 128 will be arranged to control electrically the release of packages from the apparatus when proper coins are deposited or to refund coins under certain conditions to be explained later. A face plate 91 is attached to the front panel of the apparatus by means of screws 92. A U-shaped support 93 and the bottom plate 94 are rigidly attached to the face plate 91 and are braced by corner posts 95. A refund receptacle 96 is secured to the face plate just above the bottom plate and is provided with an opening 97 through the front of the face plate. Coin channels 98 are attached to the face plate at the top and have openings 88, 89, through said plate for the reception of the coins necessary to operate the apparatus. A bracket 102 supports an electric motor 103 on the support 93. Power is transmitted from the motor through a worm 104 on the motor shaft which actuates the worm gear 105 which is attached to a shaft 106 which in turn is supported by a bearing 107 on the support 93 and by a bearing 108 attached to the face plate. A disc 109 and cams 111 and 112 are rigidly attached to the shaft 106 and a collar 113 is provided to prevent end play. A bracket 114 is provided for mounting the relays 115 and 116. The cams 111 and 112 and the associated contacts 193 and 134, are shown in Figs. 21 and 19, respectively. The contact springs are supported on bracket 117 attached to the support 93. The apparatus shown herein is provided with two coin channels but it is to be understood that any number of coin channels may be employed depending on the maximum value of the articles which it is desired to vend in any particular apparatus, the necessary contacts and releasing arms being supplied in each instance.

The electrical release units shown in Figs. 5 and 6 are associated with each storage shelf and each controls the release of one article. Similar units are provided for each class of articles vended by the machine, each magnet 31 at the point of release being connected to one of the contacts 73 on the selector unit. In the selector unit the brushes 71, 74 and 75 are arranged to rotate together on the shaft 46 under control of the selector knob 61. Only three of the contacts 73 are shown in the drawings but it is to be understood that there are as many of these contacts as there are types or series of articles to be vended. The connections from the brushes 71, 74 and 75 are carried through slip rings 78 and brushes 51 to the coin unit. The connections for the coin unit are made by means of jack springs 118 so arranged that the entire unit may readily be removed for repair or replacement. The contacts 99 and 100 are associated with the respective coin channels shown and are so arranged that they will be closed when coins are inserted in such particular channels. As has been indicated the motor 103 is arranged to drive the worm gear 105 by means of worm 104. The worm gear 105 and cams 111 and 112 are arranged to rotate together on the shaft 106.

Each storage compartment or dispensing chute contains a number or other designation in the space 121 and the price of the article also is written in this space which is visible through the glass panel 6. When the number of the desired article has been ascertained by the operator viewing the articles on the delivery chutes behind the glass panel, the knob 61 may be turned rotating the drum 53 until the number or designation of the article desired appears in the window 81. The brush 71 attached to the drum 53 will thus be brought into contact with the particular terminal 73 which is connected to the releasing mechanism of that storage compartment in which the article desired is located. The lever 122 located inside the coin channel, as shown in Fig. 17, carries an insulated pin 123 attached thereto which is adapted to move in a slot 124 and engage a spring 125 to close the contacts 99 or 100 supported adjacent thereto. When the contacts in the coin channel are closed, a circuit is closed through all the contacts 99 and 100 in series to operate relay 115. If a metallic pin 126 has been inserted in one of the holes 127 in alignment with the particular terminal 73 which is in contact with the brush 71, such pin will short circuit the contacts 99 or 100 to which the corresponding brush terminals are wired. The use of the pins thus permits the apparatus to be operated without a coin in any selected coin channel. The ring 57 in which the pins 126 are mounted may be readily removed by removing the screws 58 so that the pins 126 may be readily pressed into the holes 127 or removed therefrom as required so that any desired combination of coins will be required to operate the machine for any particular setting of the selector.

The relay 115 serves to close a circuit from the grounded side of the current source on the frame of the shelf 11 and through a contact 128 and spring member 129 closed by the weight of an article on the shelf, and the magnet 31 on the shelf, the fuse 132, contact 73, brush 71, magnet 82, ring 78, brush 51, a spring jack 118, contact 133 on the coin-controlled magnet 115, relay 116 the shaft contact 134 and a spring jack 118 to current source, as hereinafter described. The magnets 31 and 82 and the relay 116 are thus closed in series. When the magnet 82 is energized, it draws down the armature 56, and with it the tongue 65 is drawn out of engagement with the wheel 64 so that rotation of the knob 61 is not transmitted to the drum 53 and the brushes attached thereto, and the brushes cannot be moved to other contacts after the cycle of operation is started. The magnet 31 on the particular storage shelf on which the selected article is positioned when energized, draws the armature 135 on the pivot 136 against the stop 137 in preparation for a mechanical operation hereinafter explained for releasing a package.

The relay 116 is adapted to close a circuit through contact 138 to energize a magnet 139 which moves an armature 141 causing an arm 142 normally locked by a latch on the armature 141 to release, permitting the shaft 143 to rotate in the bearings 144 through the action of the spring 145. This allows arms 146 on the shaft 143 to enter holes 147 provided in the coin channels for the purpose of deflecting the coins to the "collect" channel as explained later.

The relay 116 has delayed operation to prevent the possibility of energizing the magnet 139 and releasing the arm 142 by a momentary circuit through the contacts 99 and 100. Such accidental action of the apparatus might be caused by inserting a coin in a coin channel with the refund button held in operative position which would allow the coin to pass into the refund box but would also cause a momentary closure of contact 99 or 100. The contact 148 of relay 115 is adapted to close a circuit to energize a refund release magnet 192 which raises an armature 151 open; (4) The electric current supply is cut off from the machine.

In any of these cases the operation of the refund button 153 will cause the coin or coins to be discharged from the machine in the following manner. When the refund button is pushed inward the part 152 engages the armature 151 pivotally attached to an arm 203 on shaft 199 causing the latter to rotate in bearings 201 and 102. A refund arm 200 attached to the shaft 199 engages an arm 206 on the shaft 187 causing the latter to rotate moving the pin 118 out of the path of the coin. The coin released passes down the coin channel and since the collect arm 146 is withdrawn from the coin channel, as previously explained will pass into the refund box 96 where it can be obtained by the customer. A return spring 204 restores the refund button to normal position and a spring 190 restores the arm 206 to normal position, and a spring 205 restores shaft 199 to normal position.

After the machine has been started to deliver a package the refund button is rendered ineffective by the energizing of the refund release magnet 192. This withdraws the armature 151 from engagement with the part 152 so that the movement of the refund button will not function to refund the coins.

A convenient method of supplying electrical energy for operating the machine is shown in Fig. 22. The alternating current supply leads are connected to a transformer 211 which supplies low voltage alternating current through the switch 212. The relays, magnets and motor are all designed for operation on alternating current of the particular voltage selected. An electric battery 213 may also be supplied for emergency use, and this may be a storage battery capable of being recharged for use in regular service where alternating current is not available. The voltage of the alternating current used would usually be somewhat higher than the voltage of the battery because of the impedance of the electrical equipment to alternating current.

The connection also may be made with a commercial circuit using direct or alternating current at 110 volts with relays and motors of suitable design therefor, in which case the transformer would be omitted.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An apparatus of the character described having in combination means for independently supporting in fixed relation to a point of discharge a variety of articles for delivery, means in fixed relation to said article supporting means for preconditioning a selected delivery means for one of said articles for delivery, common delivery means, and means for positively moving said article subject to said preconditioning means, to a position for free movement from a position of storage to a position accessible to the operator.

2. An apparatus of the character described having in combination a multiple article delivery unit having article delivery elements, an article selector unit interconnected with individual selector elements adjacent respectively each individual article delivery element and operably conditioned selectively in relation thereto by said selector unit, a coin controlled unit cooperating therewith, interconnected simultaneously operated delivery actuating mechanism, and means permitting the independent removal of each unit.

3. An apparatus of the character described having in combination an article delivery unit comprising a plurality of delivery chutes adapted to supply a variety of articles, and separable article selector and coin units, adapted to be associated therewith, to control the selection and delivery of any article from said delivery unit.

4. An apparatus of the character described having in combination an article delivery unit in fixed relation to a point of discharge adapted to supply a plurality of articles of various sizes and values, an article selector unit associated therewith, a coin controlled mechanism set to predetermined values by said selector unit, and a single motor operated by said selector and coin control units, for carrying out a cycle of electrical and mechanical operations to positively move a predetermined article from a retaining member on said article-carrying unit.

5. An apparatus of the character described having in combination a plurality of article delivery compartments in fixed relation to a point of discharge, a coin control unit selectively related thereto, means associated with each delivery compartment for rendering operable said coin control unit, a common passageway for said articles, and an automatic closure to prevent access to said passageway.

6. An apparatus of the character described having in combination a plurality of article delivery compartments in fixed relation to a point of discharge, a coin control unit selectively related thereto, means associated with each delivery compartment for rendering operable said coin control unit, a common passageway for said articles, an automatic closure to prevent access to said passageway, and means to release said closure when a package is in course of delivery.

7. An apparatus of the character described having in combination an article delivery unit, an article selector unit, a coin control unit, and means to render said selector unit ineffective after said coin control unit has been operated.

8. An apparatus of the character described having in combination a cabinet, an article delivery unit separable from said cabinet, an article selector unit and a coin control unit, each individually and independently supported as a complete unit, and separable from said cabinet, and means associating said units with each other to select an individual article and deliver the same to a common delivery point.

9. An electrical control for vending machines comprising a source of current supply, and a plurality of package control units, selective mechanism for energizing one of said package control units, a coin control unit, means associated with said package control units for rendering operable said coin control unit, a plurality of relays responsive to the coin control unit and adapted to collect the deposit coins in said unit, to start and maintain the operation of the actuating motor, and to break the circuit after the cycle of operation has been completed.

10. An electrical control for vending machines comprising a source of current supply, and a plurality of package control units, a coin control unit, package controlled switches associated with said coin control unit, selective mechanism for energizing one of said package control units, a plurality of relays responsive to the coin control unit and package controlled switches, and adapted to collect the deposit coins in said unit, to start and maintain the operation of the actuating motor, and to break the circuit after the cycle of operation has been completed.

11. An apparatus of the character described having in combination a coin control unit, article delivery units in fixed relation to a point of discharge, an article delivery actuating mechanism common to all said article delivery units adapted to be actuated through a complete cycle of motion, a selector unit in fixed relation to said delivery units, and means controlled by said selector unit to bring one of said article delivery units into operative association with said common delivery actuating mechanism to effect the delivery of a selected article of merchandise.

12. An apparatus of the character described having in combination a coin control unit, a selector unit, article delivery units in fixed relation to a point of discharge, an article delivery mechanism common to all said article delivery units adapted to be actuated through a complete cycle of motion, means controlled by said selector unit to bring one of said article delivery units into operative association with said delivery actuating mechanism to effect the delivery of a selected article of merchandise, and package controlled means for effecting collection of coins when the apparatus is operated.

13. An apparatus of the character described having in combination a coin control unit, a selector unit, article delivery units, an article delivery mechanism having an individual delivery element extending to a point adjacent each individual delivery unit, a motor for actuating said delivery mechanism, electromagnetic means controlled by said selector unit to bring one of said article delivery elements into operative association with the delivery unit to effect the delivery of a selected article of merchandise.

14. An apparatus of the character described having in combination a coin control unit, a selector unit, article delivery units, an article delivery mechanism having an individual delivery element extending to a point adjacent each individual delivery unit, a motor for actuating said delivery mechanism, electromagnetic means controlled by said selector unit to bring one of said article delivery elements into operative association with the delivery units to effect the delivery of a selected article of merchandise, and means associated with said delivery mechanism for rendering inoperative said delivery means upon the exhaustion of the supply of articles.

15. An apparatus of the character described, having in combination a plurality of delivery units for articles of merchandise, an article delivery mechanism adapted to extend throughout the apparatus and having individual elements adjacent each group of articles to be delivered, a selector unit for associating any one individual delivery element with the article delivery mechanism, a coin control unit, a drum actuated by said selector unit serving to prepare such apparatus for the delivery of any pre-selected article and simultaneously to set said coin control for response to a predetermined number of coins, and a single operating motor for said delivery system set in motion through the setting of said selector unit and the deposit of the coins in the coin control unit.

16. An apparatus of the character described, having in combination an article delivery unit comprising a plurality of shelves inclined sharply from back to front, article discharging means associated with said shelves, selector means for preconditioning a selected discharging means for one of said articles for delivery, a coin control unit selectively related thereto, means associated with each delivery shelf for rendering operable said coin control unit, and means for operating said article discharging means.

17. An apparatus of the character described having in combination, means for supporting a variety of articles in fixed relation to a point of discharge, a common delivery element operating adjacent to said supporting means, means for positively lifting and releasing a selected article for movement toward a point of delivery, coin controlled means for causing reciprocating movement of said common delivery element, and a selector associated with said delivery element to select any article for delivery.

18. An apparatus of the character described having in combination, means for supporting a variety of articles in fixed relation to a point of discharge, a common delivery element operating adjacent to said supporting means, means for positively moving a selected article to a position for free movement toward a point of delivery, a series of relays adapted to be operated by insertion of a predetermined number of coins, a motor operated by said relays for causing movement of the common delivery element, and a selector associated with said delivery element adapted to select any article for delivery.

19. An apparatus of the character described having in combination, means for supporting a variety of articles in fixed relation to a point of discharge, a common delivery element operating adjacent to said supporting means, means for positively moving a selected article to a position for free movement toward a point of delivery, a coin mechanism for operating a series of relays after a predetermined number of coins have been inserted, a motor operated by said relays for causing movement of the common delivery element, a selector associated with said delivery element and said coin mechanism, to preselect any article for delivery and to set the coin mechanism and associated relays to start the motor only when the predetermined number of coins have been inserted.

20. An apparatus of the character described having in combination a multiple article delivery unit independently supporting each series of articles in fixed relation to a point of discharge having means for positively moving a preselected article to a position for free movement toward a point of delivery, an article selector unit, means associated with said selector unit for determining price, a coin control unit cooperating therewith, means in said coin control unit responsive to coins of the preselected value for rendering such selected article subject to the delivery mechanism, and means actuated by the preselected article for effecting the disposition of the coin in the coin control unit.

21. An apparatus of the character described having in combination a multiple coin unit, means in said coin unit responsive to coins of preselected value, an article selector unit associated therewith, an article delivery unit independently supporting each series of articles in fixed relation to a point of discharge, means for positively lifting and releasing a preselected article to a position for free movement toward a point of delivery controlled by said selector and coin units, refund means operable externally of the apparatus, and means associated with said refund means for rendering the same inoperative upon the deposit of coins of preselected value.

22. An apparatus of the character described having in combination an article delivery unit independently supporting each series of articles in fixed relation to a point of discharge adapted to contain articles of various values, and a multiple coin unit associated with said delivery unit, and means connected with said article delivery unit for rendering said coin unit operable when said delivery unit is supplied with articles to be delivered.

23. An apparatus of the character described having in combination an article delivery unit independently supporting each series of articles in fixed relation to a point of discharge adapted to contain articles of various values, common delivery means for said artcles, an article selector unit adapted to select one of a plurality of articles, and a multiple coin unit associated with said delivery unit and automatically set by the selector unit to respond to a predetermined number of coins simultaneously with the selection of an article to be delivered.

24. An apparatus of the character described having in combination an article delivery unit independently supporting each series of articles in fixed relation to a point of discharge, an article selector unit, a coin control unit, and a refund mechanism operable by the depositor and by the internal mechanism adapted to restore coins to the depositor and means to render ineffective the refund mechanism operable by the depositor when said internal mechanism is operated.

25. An apparatus of the character described having in combination a series of compartments for supporting a variety of articles, individual delivery elements for said articles, a coin control unit, a common delivery actuating mechanism adapted to be operated through a cycle of motion adjacent to said delivery elements under control of said coin control unit, electro-magnetic means for engaging said delivery actuating mechanism with a selected individual delivery element, and a selector unit cooperating with said coin unit to energize said electro-magnetic means to effect the delivery of a selected article of merchandise.

26. An apparatus of the character described having in combination a series of compartments adapted to support a variety of articles in fixed relation to a point of discharge, a delivery mechanism adapted to be actuated through a cycle of motion to move one of said articles toward a point of discharge, means providing an electrical cycle of control of said delivery mechanism, a coin control mechanism adapted to actuate said electrical cycle of control when predetermined coins are deposited therein, and a member actuated through a cycle of motion in synchronism with said article delivery mechanism adapted to control the electrical cycle of control of operation.

27. An apparatus of the character described having in combination an article supporting means comprising compartments in fixed relation to a point of discharge and individual releasing mechanism for said respective articles, common actuating mechanism for said releasing mechanism, selector means, means for rendering effective said selector means, and coin-controlled means rendered effectively operable by said selector means for operating said releasing means.

28. An apparatus of the character described having in combination an article supporting means comprising compartments in fixed relation to a point of discharge, article delivery means associated therewith, a common delivery actuating means for said article delivery means, unitary article selecting means for preselecting any of the articles on said delivery means, coin controlled means rendered effectively operable by said article selecting means for operating said delivery means, refund means operable externally of the apparatus, and means associated with said refund means for rendering the same inoperative upon the deposit of coins of a pre-selected value.

EDWARD G. WEILER.